3,418,075
PREPARATION OF TITANIUM PHOSPHATE
Jean Marie Piret, 5 Rue de Chantilly
Watermael, Belgium
No Drawing. Filed Feb. 25, 1966, Ser. No. 529,968
Claims priority, application Great Britain, Mar. 19, 1965, 11,724/65
5 Claims. (Cl. 23—105)

ABSTRACT OF THE DISCLOSURE

Ion-exchange properties of titanium phosphate produced by treating a titanium compound with a sulfate in the presence of sulphuric acid of specific gravity of 1.84 and then treating the resulting titanyl sulphate with 85% phosphoric acid are improved by adding in the latter step enough water to cause a spontaneous temperature increase to 90–100° C. upon mixing, wtihout external heating.

---

This invention relates to a process for the preparation of titanium phosphate. More particularly, the invention concerns a process for preparing crystalline grains of titanium phosphate.

According to this invention, titanium phosphate is prepared from titanium oxide or from a similar compound, (1) by reacting it with a sulphate in the presence of sulphuric acid having a specific gravity of 1.84 (98%), so as to obtain a clear solution of titanyl sulphate in highly concentrated sulphuric acid and (2) by reacting said dissolved titanyl sulphate with phosphoric acid, preferably 85% phosphoric acid, in an aqueous medium.

The mixture of titanium oxide, ammonium sulphate and concentrated sulphuric acid is preferably heated gradually to about 200° C.

The clear solution of titanyl sulphate, phosphoric acid and water is preferably stirred without external heating, the temperature of said solution increasing spontaneously to about 90–100° C.

The invention is further illustrated by the following examples:

EXAMPLE 1

This example describes the preparation of titanium phosphate by the process according to this invention.

50 g. of titanium oxide are mixed with 500 g. of ammonium sulphate and 1 liter of sulphuric acid having a specific gravity of 1.84 (98%).

The substantially water free mixture is gradually heated to 200° C., while being stirred.

A clear solution of titanyl sulphate in highly concentrated sulphuric acid is obtained.

The clear solution is cooled and a mixture of 85% phosphoric acid (0.26 liter) and water (0.39 liter) is added.

The mixture is stirred and the temperature spontaneously climbs to 90°–100° C. The obtained gel is diluted with water. It is filtered and washed with water until the the filtrate is no longer acid. The air dried product has the form of crystalline grains.

EXAMPLE 2

This example describes the preparation of titanium phosphate by a known process.

A mixture of 40 g. of titanium oxide and of 150 g. of ammonium sulphate is added to 1 liter of sulphuric acid having a specific gravity of 1.84.

This mixture is gradually heated to 180° C. while being stirred. The obtained clear solution is allowed to cool to room temperature.

To this solution 250 ml. of phosphoric acid of a density of 1.84 g./cm.³ are added and the mixture is gradually heated to 170° C. within two hours, while being stirred. A gel is obtained which is allowed to cool to room temperature.

The gel is then filtered and washed with water until the filtrate reaches a pH of about 4. The gel is then allowed to dry in ambient air. The dry product has the shape of crystalline grains.

EXAMPLE 3

The titanium phosphate obtained in Example 1 (process according to the invention), called "titanium phosphate A" and the titanium phosphate obtained in Example 2 (known process), called "titanium phosphate B" have been tested in order to determine the ion exchange capacities of these compounds.

The test solution used for the comparison between the two grades of titanium phosphates A and B contains 0.266 g. of cesium per liter of nitric acid 0.5 N. This solution is allowed to flow on the ion-exchanger (titanium phosphate A or B) at a rate of seven bed volumes per hour.

In this dynamic test, the exchange capacity is expressed in milli-equivalents of cesium adsorbed per gram of ion-exchanger when the concentration C of Cs in the effluent is 0.001 the concentration $C_0$ in the test solution $$(C/C_0 = 0.001)$$

| | Exchange capacity |
|---|---|
| Titanium phosphate A | 0.435 |
| Titanium phosphate B | 0.069 |

These values emphasize the outstanding exchange capacity of titanium phosphate A, obtained by the process according to this invention.

I claim:

1. In a process for the preparation of titanium phosphate in which a titanium compound is treated with a sulphate in the presence of sulphuric acid having a specific gravity of 1.84, so as to obtain a clear solution of titanyl sulphate in highly concentrated sulphuric acid which is cooled, and the dissolved titanyl sulphate is treated with 85% phosphoric acid; the improvement comprising conducting said treatment with 85% phosphoric acid in the presence of a quantity of water sufficient to cause a spontaneous temperature increase to 90–100° C. upon mixing, without external heating.

2. A process as claimed in claim 1, said titanium compound being titanium oxide.

3. A process as claimed in claim 1, said sulphate being ammonium sulphate.

4. A process as claimed in claim 3, in which said titanium compound is titanium oxide.

5. A process as claimed in claim 4, and heating said mixture of titanium oxide, ammonium sulphate and sulphuric acid gradually to about 200° C. prior to said cooling.

References Cited

UNITED STATES PATENTS

| 2,038,078 | 4/1936 | Hardiek | 23—105 |
| 3,056,647 | 10/1962 | Amphlett | 23—14.5 |

OSCAR R. VERTIZ, *Primary Examiner.*